Patented Nov. 19, 1940

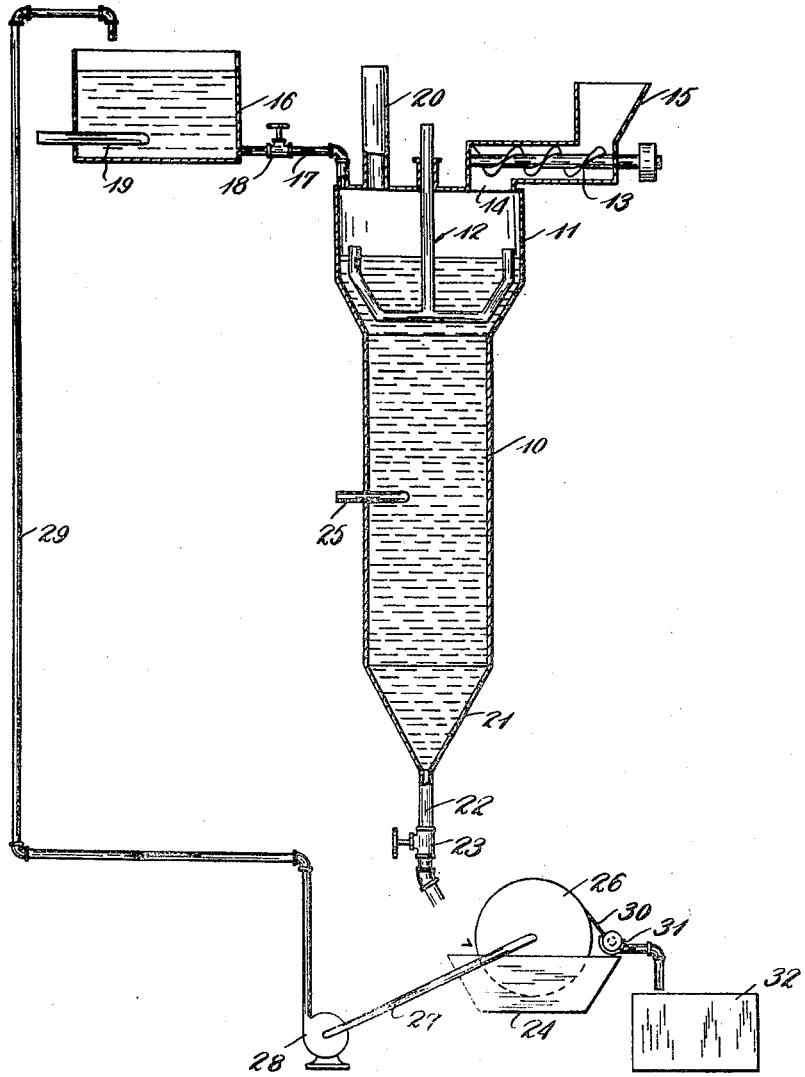

2,222,468

UNITED STATES PATENT OFFICE 2,222,468

METHOD OF TREATING ZINC SULPHIDE ORES TO PRODUCE ZINC SULPHATE AND HYDROGEN SULPHIDE

Harold F. Saunders, Chicago, Ill., and Charles E. Penoyer, Coffeyville, Kans., assignors to The Sherwin-Williams Company, Cleveland, Ohio, a corporation of Ohio Application April 8, 1938, Serial No. 201,014

4 Claims. (Cl. 23—125)

This invention relates to a process of manufacturing zinc sulphate and hydrogen sulphide from ores containing zinc sulphide, of which zinc blende is a typical example. It is the object of the invention to provide a continuous cyclic process that will be efficient and operate at a relatively low cost.

A novel form of apparatus for practicing the invention as described and claimed in my copending application Serial No. 201,012, filed April 8, 1938, is illustrated in the accompanying drawing in which the various parts of the apparatus are diagrammatically shown.

Essentially the process consists in continuously feeding into a suitable tank, made of acid-resisting material, streams of sulphuric acid and pulverized ore and continuously withdrawing from the bottom of the tank the zinc sulphate crystals with sufficient of the acid to permit easy flow.

In practicing the invention the tank 10 is filled with sulphuric acid having a specific gravity of 1.55 to the level indicated in the drawing. The upper part of the tank 10 is enlarged as indicated at 11, and contains an agitator 12 which may be rotated by any suitable power means. A screw conveyor 13 is provided at the top of the tank 10 for feeding the finely pulverized ore through the opening 14. The ore should be of a fineness to pass through a 200 mesh screen and is supplied to the screw 13 from the hopper 15.

The acid supply tank is indicated at 16 and contains sulphuric acid of 1.55 specific gravity which is maintained at its boiling point of approximately 150° C. by a heating coil 19. The acid may be fed into the top of the tank 10 by means of the pipe 17 which has a control valve 18 therein. A discharge pipe 20, for the hydrogen sulphide gas, is provided at the top of the tank and may lead to any suitable apparatus for purifying the gas for any desired industrial use.

The bottom of the tank 10 is preferably of conical shape, as indicated at 21, so that the precipitate that settles in the tank will flow out through the pipe 22, which has a control valve 23 therein, and into the receptacle 24. A heating coil 25, or other suitable heating means, is provided in the tank 10 for the purpose of maintaining the contents of the tank at the boiling point of the acid, or approximately 150° C.

The material that is discharged into the receptacle 24 is filtered by any suitable filtering means such as the revolving filter 26, which may be driven from any suitable source of power. A suction pipe 27 leads from the filter 26 to the pump 28 which pumps the acid through the pipe 29 to the tank 16. A scraper 30 cooperates with the filter 26 to scrape the zinc sulphate therefrom and discharge it into the conveying trough 31 whence the zinc sulphate, with its impurities, may be discharged into a suitable purifying apparatus indicated at 32.

In accordance with our improved process the finely pulverized ore is continuously fed into the top of the tank 10 by means of the screw 13 at a rate which is carefully regulated in accordance with the capacity of the tank and the rate at which the reaction is carried out. Of course, the tank 10 is first filled with the acid to the level indicated in the drawing, and this level is maintained as uniformly as practicable. The temperature of the mass in the tank 10 is maintained at the boiling point of the acid by means of the heating coil 25 and acid is continuously fed into the tank 10, from the tank 16, at the proper rate to maintain the level in the tank as indicated in the drawing. This means that sufficient acid must be constantly fed into the tank 10 to make up for the loss due to the reaction with the ore and for the acid that is withdrawn from the bottom of the tank.

The agitator 12 is preferably of the slow-speed paddle type for the purpose of beating down the froth that tends to form on the mass in the tank 10. The reaction between the acid and the ore forms hydrogen sulphide gas on the surface of the ore particles, which buoys the particles to the surface until the reaction is complete. As the zinc sulphate crystals are formed by the reaction they settle rapidly to the lower portion of the tank 10 and, for this reason, the agitation is confined to the top portion of the tank so that the lower portion of the tank will serve as a settling zone for the zinc sulphate crystals.

By maintaining the mass in the tank 10 at the boiling temperature of the acid, any water that is brought into the tank with the ore, or that is left as a result of the reaction between the acid and the ore, will be vaporized and pass out with the hydrogen sulphide gas through the discharge pipe 20, and may be separated from the gas by being passed through a suitable condenser.

By means of the valve 23 the discharge from the bottom of the tank may be regulated so that just sufficient acid will be taken along with the zinc sulphate and other solids to give an adequate flow.

By means of the filter 26 the sulphuric acid will be separated from the zinc sulphate and other solids and may be returned to the tank 16 by means of the pump 28.

The zinc sulphate, with the impurities and any unreacted ore that are carried along with it, will be scraped from the filter 26, by the scraper 30, and carried by the conveyor 31 to any suitable purifying apparatus wherein the zinc sulphate may be leached out and purified in accordance with well known methods. The unreacted ore may be returned to the hopper 15.

The importance of the acid concentration and temperature is indicated by the fact that they affect recovery and conversion, i. e., higher concentration and higher temperature increase the loss as colloidal sulphur while low temperature reduces the speed and completeness of the reaction.

From the foregoing it will be evident that we have provided a simple process for continuously manufacturing zinc sulphate and hydrogen sulphide gas from an ore containing zinc sulphide, and the process is cyclic in that the acid that is withdrawn from the bottom of the tank 10 is returned to the tank 16 for reuse. Also, any unreacted ore is returned to the ore supply.

Having thus described our invention, we claim:

1. The hereindescribed continuous process of making hydrogen sulphide and zinc sulphate which consists in continuously feeding into a reaction chamber containing a body of sulphuric acid of substantially 1.55 specific gravity which is maintained at its boiling temperature a stream of finely pulverized material containing zinc sulphide, and a stream of sulphuric acid of substantially the same specific gravity and temperature as said body of acid, the reacting particles being maintained in the upper portion of the mass in the reaction chamber by the buoyant effect of the gas on the reacting particles and being subject to agitation until the reaction is substantially complete, the lower portion of the mass being unagitated and constituting a settling zone, withdrawing hydrogen sulphide and water vapor from the top of said chamber, withdrawing a suspension of zinc sulphate in sulphuric acid from the bottom of said chamber, and filtering said suspension to separate the zinc sulphate from the acid, the amount of the acid that is fed into the top of the chamber being regulated to maintain the mass in the chamber at a constant level.

2. The hereindescribed continuous process of making hydrogen sulphide and zinc sulphate which consists in continuously feeding into a reaction chamber containing a body of sulphuric acid of substantially 1.55 specific gravity which is maintained at its boiling temperature a stream of finely pulverized material containing zinc sulphide, and a stream of sulphuric acid of substantially the same specific gravity and temperature as said body of acid, the reacting particles being maintained in the upper portion of the mass in the reaction chamber by the buoyant effect of the gas on the reacting particles and being subject to agitation until the reaction is substantially complete, the lower portion of the mass being unagitated and constituting a settling zone, withdrawing hydrogen sulphide and water vapor from the top of said chamber, withdrawing a suspension of zinc sulphate in sulphuric acid from the bottom of said chamber, filtering said suspension to separate the zinc sulphate from the acid, and returning the acid filtrate to the acid supply from which said stream of acid is taken.

3. The hereindescribed continuous process of making hydrogen sulphide and zinc sulphate which consists in continuously feeding into a reaction chamber containing a body of sulphuric acid of substantially 1.55 specific gravity which is maintained at its boiling temperature a stream of finely pulverized material containing zinc sulphide, and a stream of sulphuric acid of substantially the same specific gravity and temperature as said body of acid, the reacting particles being maintained in the upper portion of the mass in the reaction chamber by the buoyant effect of the gas on the reacting particles and being subject to agitation until the reaction is substantially complete, the lower portion of the mass being unagitated and constituting a settling zone, withdrawing hydrogen sulphide and water vapor from the top of said chamber, withdrawing a suspension of zinc sulphate and impurities derived from said material in sulphuric acid from the bottom of said chamber, filtering said suspension to separate the acid, returning the acid filtrate to the acid supply from which said stream of acid is taken, and then purifying the zinc sulphate.

4. The hereindescribed continuous process of making hydrogen sulphide and zinc sulphate which consists in continuously feeding into a reaction chamber containing a body of sulphuric acid of substantially 1.55 specific gravity which is maintained at its boiling temperature a stream of finely pulverized material containing zinc sulphide, and a stream of sulphuric acid of substantially the same specific gravity and temperature as said body of acid, the reacting particles being maintained in the upper portion of the mass in the reaction chamber by the buoyant effect of the gas on the reacting particles and being subject to agitation until the reaction is substantially complete, the lower portion of the mass being unagitated and constituting a settling zone, withdrawing hydrogen sulphide and water vapor from the top of said chamber, withdrawing a suspension of zinc sulphate in sulphuric acid from the bottom of said chamber, filtering said suspension to separate the zinc sulphate from the acid, and returning the acid filtrate to the acid supply from which said stream of acid is taken, the amount of the acid that is fed into the top of the chamber being regulated to maintain the mass in the chamber at a constant level.

HAROLD F. SAUNDERS.
CHARLES E. PENOYER.